Patented Jan. 6, 1942

2,269,167

UNITED STATES PATENT OFFICE 2,269,167

WELDING FLUX

Gareth G. Somerville and Garnett H. Porter, Pittsfield, Mass., assignors to General Electric Company, a corporation of New York No Drawing. Application June 21, 1939, Serial No. 280,351

3 Claims. (Cl. 148—26)

Our invention relates to welding fluxes and their method of manufacture.

The quality of a weld depends in large measure on the nature of the welding flux used in making it and the commercial possibilities of a welding operation are often determined by the cost of the welding flux. Consequently, advancement in welding is dependent primarily upon the development of improved welding fluxes which can be produced at low cost.

It is an object of our invention to provide an improved welding flux and a method of manufacturing the same.

It is a further object of our invention to provide a welding flux which may be obtained at low cost.

Further objects of our invention will become apparent from the following description thereof.

Our flux is particularly suited for that type of electric welding in which the welding operation proceeds under a blanket of flux material which is applied to the work and in which the end of the welding electrode is buried. This method of welding has been identified in the art as flux shielded arc welding. When a metallic electrode is employed, it is referred to as flux shielded metallic arc welding.

We produce our flux from the natural mineral wollastonite by removing therefrom its gas-forming constituents. Either before or after removing its gas-forming constituents, we reduce it to crystal-like particles of a size suitable for use in flux shielded arc welding. Any non-uniformity in the wollastonite used in making our flux may be corrected by thoroughly mixing the granulated particles produced in accordance therewith.

We have for the most part used wollastonite obtained from a deposit near Willsboro, New York. This material contains approximately 95 per cent $CaSiO_3$ and small percentages of garnet, diopside and calcite. A typical analysis of this material is as follows:

| | Per cent |
|---|---|
| Silica | 49.80 |
| Lime | 46.51 |
| Iron and aluminum oxides | .75 |
| Magnesia | 1.00 |
| Alkalies | .40 |
| Ignition loss | 1.50 |

We have also used wollastonite obtained from quarries in California where it occurs in almost pure white crystal aggregates and in aggregates having sharply defined gray-green strata running through the almost pure white material. About two-thirds of this form of wollastonite is white material and the other third is the gray-green material. Spectographically, the white portions appear to be very similar to the above referred to New York State wollastonite. The gray-green portion is high in magnesia, iron oxide and titanium. About 87 per cent of this form of wollastonite is $CaSiO_3$. Typical analyses are as follows:

| | White | Gray-green |
|---|---|---|
| | Percent | Percent |
| Silica | 49.8 | 44.9 |
| Lime | 46.0 | 31.3 |
| Iron oxide | 0.6 | 7.0 |
| Titanium oxide | 0.1 | 0.4 |
| Aluminum oxide | 1.5 | 9.4 |
| Magnesia | 0.6 | 5.5 |
| Loss at 1100° C | 0.8 | 0.8 |

Untreated wollastonite is not suitable as a welding flux since it produces in the weld blow holes which are undesirable. If, however, the wollastonite is treated to remove from it all volatile matter, it becomes an excellent welding flux. For the most part the volatile matter in untreated wollastonite is carbon dioxide which is liberated from the carbonates contained therein. These carbonates are principally calcite. They may be removed by chemically treating the crude ground wollastonite with a weak acid solution and thereafter washing repeatedly with water to remove the water soluble chlorides formed thereby. Weak acid solutions will liberate carbon dioxide from a carbonate such as calcite without attacking the calcium silicate which is the principal and characteristic ingredient of wollastonite. We prefer, however, to expel the volatile matter from the crude wollastonite by a roasting process such as that employed for converting limestone into lime. We have found that an effective roasting operation may be accomplished at temperatures as low as 800° C., where thin layers of the ground material not more than ¼" deep are heated and subjected to the free circulation of air. We prefer, however, to roast it in lump form at 1200° C. until it changes to a brown color. The New York wollastonite changes to a darker brown than the California wollastonite when roasted at this temperature.

After roasting, the lumps are passed through a crusher which reduces them to a size suitable for pulverizing and thereafter the crushed material is fed through a pulverizer which is adjusted to give as large a percentage as possible of 10- to 30-mesh particles. After passing the ore through the pulverizer, it is screened and for flux shielded metallic welding, preferably only particles of from 10- to 80-mesh are used.

Since this roasted wollastonite flux contains lime which will pick up carbon dioxide from the air, again forming undesired carbonates, it should be stored in sealed containers and, if likely to be subjected to dampness, should be enclosed in metal containers until it is used in performing a welding operation.

One flux composition that has given excellent results consists essentially of granulated gas-free wollastonite to which has been added .4% of lamp black. We prefer to use a lamp black produced by the incomplete combustion of natural gas which has a particle size of approximately 60 millimicrons and contains no impurities.

Various other ingredients may, however, be combined with our granulated non-gassing wollastonite to accomplish particular results. For example, weld penetration may be increased by adding about 5 per cent titanium dioxide or by adding aluminum powder in percentages from .5 per cent to 2 per cent. Furthermore, various alloying or deoxidizing agents may be added to the flux, such, for example, as molybdenum, ferro-manganese, and the like.

What we claim as new and desire to secure by Letters Patent of the United States is:

1. A welding flux having as its principal ingredient non-gassing wollastonite particles that will pass a 10-mesh screen and will not pass an 80-mesh screen.

2. A welding flux having as its principal ingredient non-gassing wollastonite particles that will pass a 10-mesh screen and will not pass an 80-mesh screen and containing about .4 per cent pure lamp black obtained by the incomplete combustion of natural gas and having a particle size of approximately 60 millimicrons.

3. The method of preparing an arc welding flux from wollastonite which includes the steps of roasting it to remove substantially all of the moisture and carbon dioxide therefrom, grinding and screening it to obtain particles that will pass a 10-mesh screen and will not pass an 80-mesh screen, and mixing additional flux ingredients with said particles.

GARETH G. SOMERVILLE.
GARNETT H. PORTER.